March 23, 1926. 1,577,976
J. S. KNOWLSON ET AL
POWER DRIVEN TOOL OPERATING DEVICE
Filed April 24, 1922  4 Sheets-Sheet 1
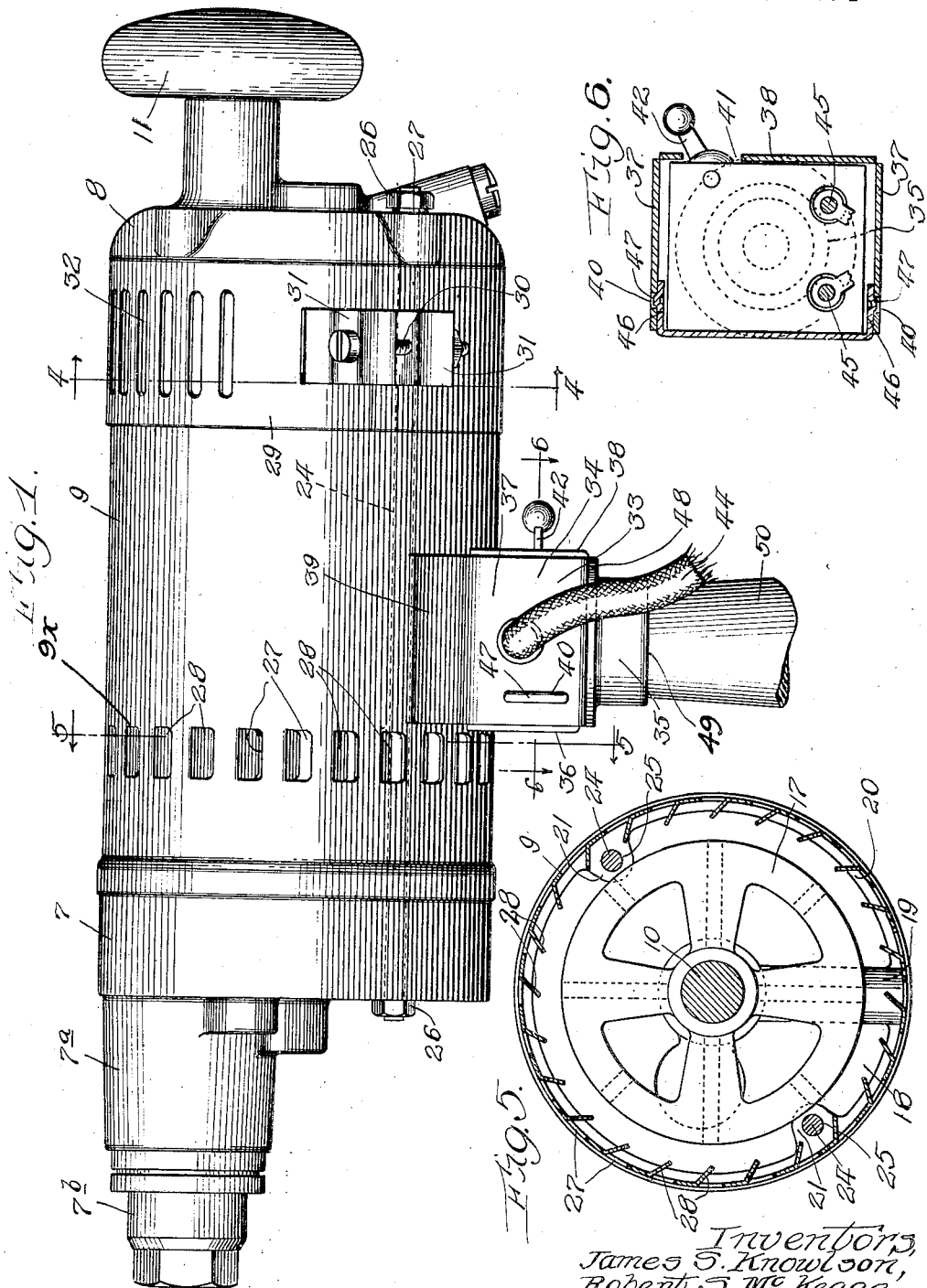
Inventors,
James S. Knowlson,
Robert S. McKeage,
By their Attorneys.

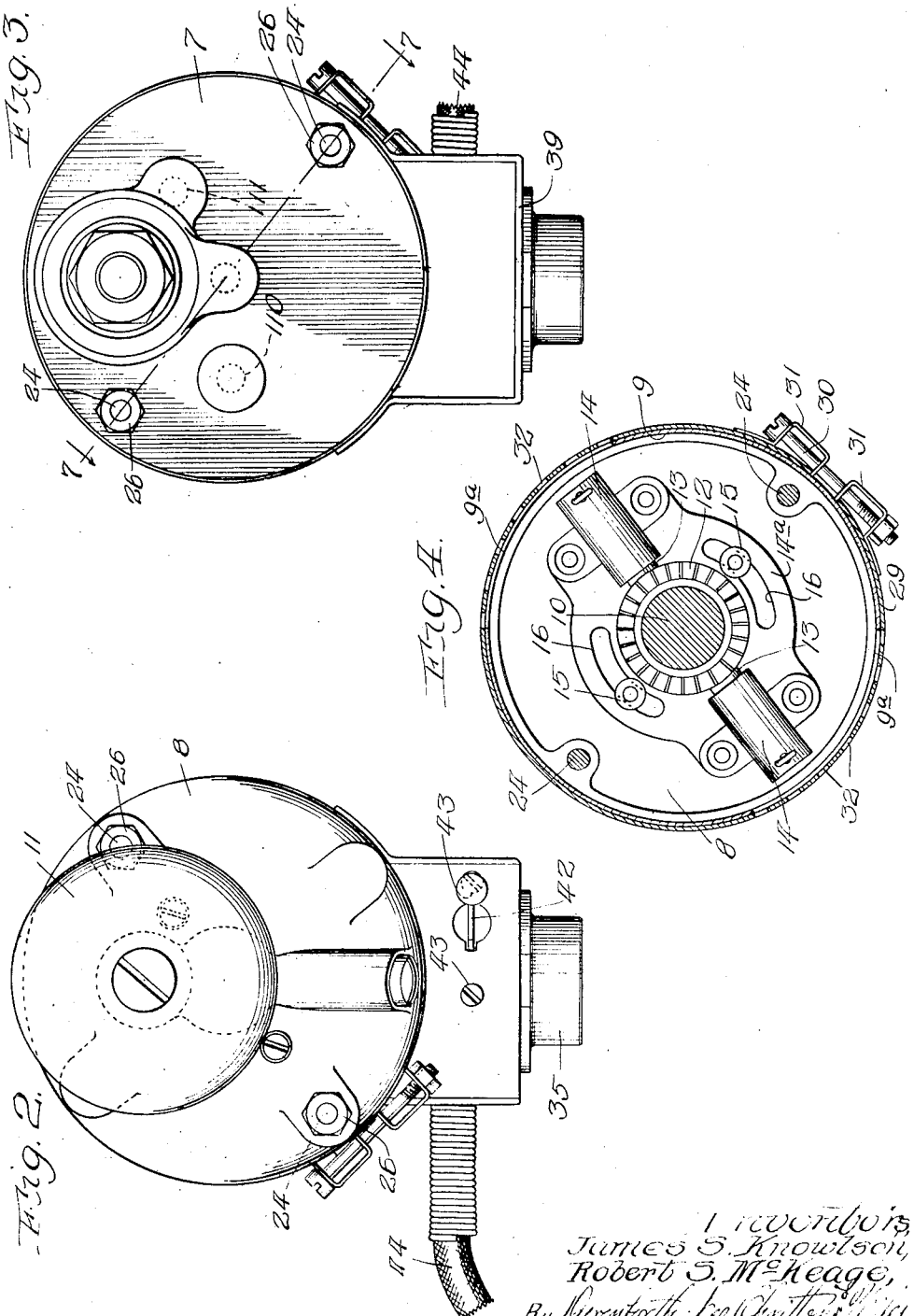

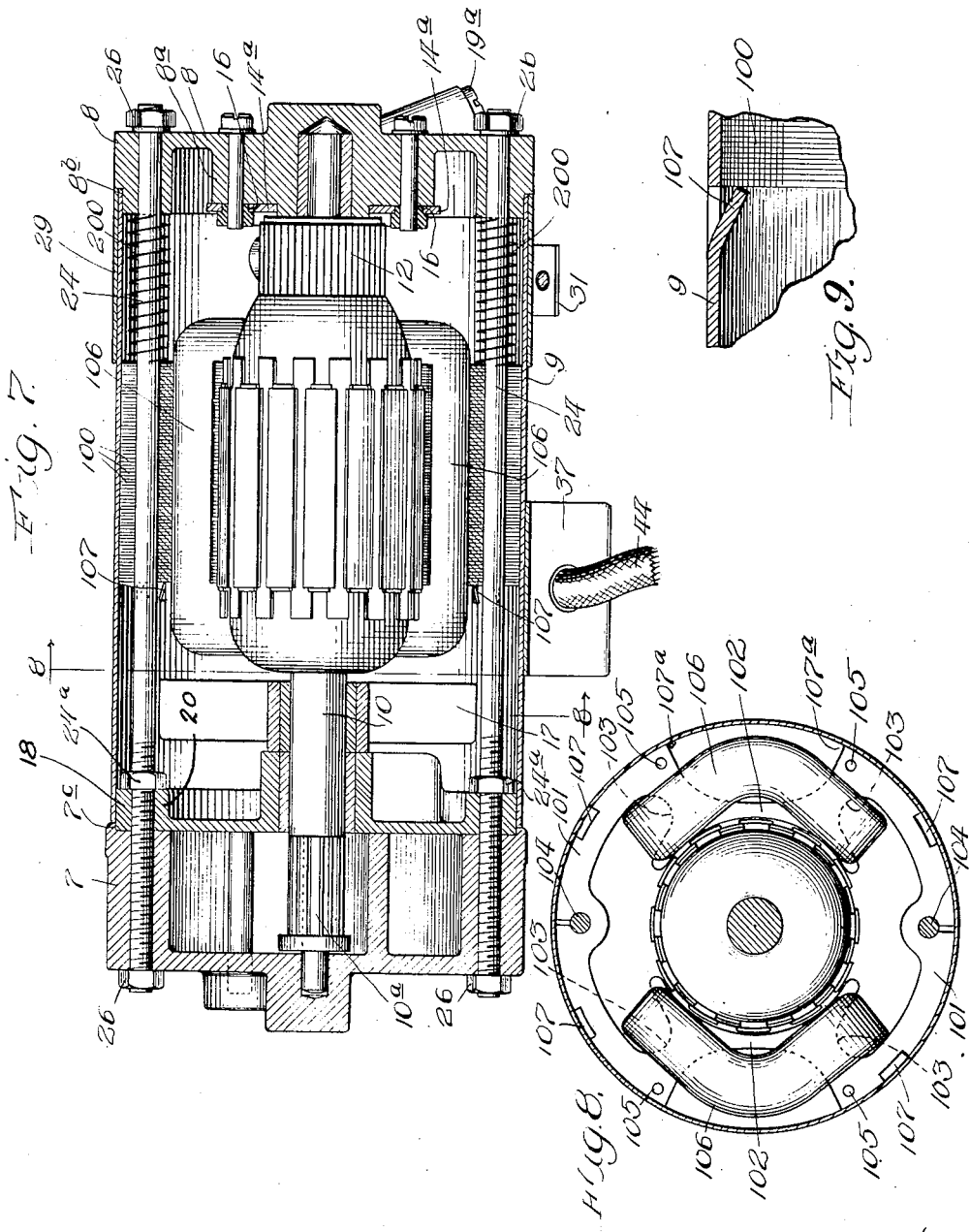

March 23, 1926.  1,577,976
J. S. KNOWLSON ET AL
POWER DRIVEN TOOL OPERATING DEVICE
Filed April 24, 1922   4 Sheets-Sheet 4
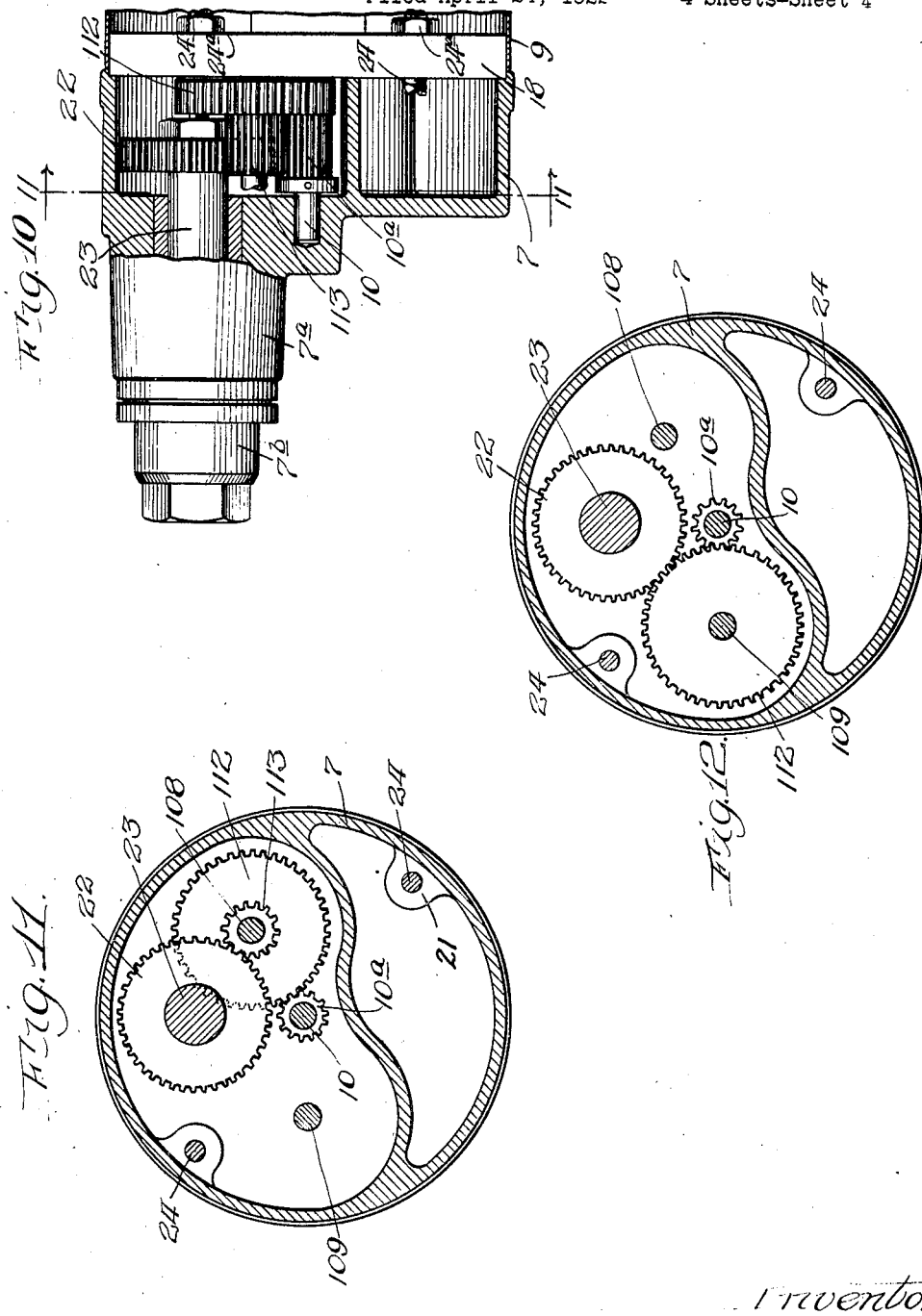

Patented Mar. 23, 1926.

1,577,976

UNITED STATES PATENT OFFICE.

JAMES S. KNOWLSON, OF OAK PARK, AND ROBERT S. McKEAGE, OF CHICAGO, ILLINOIS, ASSIGNORS TO ELECTRO-MAGNETIC TOOL COMPANY, OF CHICAGO, ILLINOIS, A CORPORATION OF ILLINOIS.

POWER-DRIVEN TOOL-OPERATING DEVICE.

Application filed April 24, 1922. Serial No. 556,176.

*To all whom it may concern:*

Be it known that we, JAMES S. KNOWLSON, a citizen of the United States, residing at Oak Park, in the county of Cook and State of Illinois, and ROBERT S. McKEAGE, a citizen of the United States, residing at Chicago, in the county of Cook and State of Illinois, have invented a new and useful Improvement in Power-Driven Tool-Operating Devices, of which the following is a specification.

Our invention relates generally to power-driven tool-operating devices, but more particularly, though not to the exclusion of its incorporation in other devices, to devices for rotating tools, such as drills, screw-drivers and other tools, by means of an electric motor forming a part of the device.

As devices of the general character above referred to have hitherto been provided, the cost of constructing the same has been relatively great; and it is one of our objects to provide improvements in such devices, whereby the same may be produced more economically, without rendering the structure subject to impairment in use.

More specifically stated, prior constructions have involved as the casing therefor, casing sections comprising specially formed cast members, and the switch housings have also been formed of cast members, the latter usually as a part integral with one of the sections forming the main casing of the device; and in this connection our invention involves the elimination of the cast section of the casing intermediate the ends thereof, and the substitution therefor of a section which may be made of ordinary metal sheeting, and also the making of the switch housing of sheet metal instead of casting it, the invention also involving features of construction as hereinafter described.

Other objects are to provide for the ready disassembly of certain parts of the structure without disassembling other parts thereof, and to provide for the ready conditioning of the device for driving the tool at either relatively high or relatively low speed.

Referring to the accompanying drawings:

Figure 1 is a view in side elevation of an electrically-driven tool-rotating device suitable for use in connection with drills and other tools and embodying our invention. Figure 2 is a view in end elevation of the device, viewing it from the right hand end of Fig. 1. Figure 3 is a similar view, viewing the device from the opposite end of Fig. 1. Figure 4 is a section taken at the line 4—4 on Fig. 1 and viewed in the direction of the arrows. Figure 5 is a section taken at the line 5—5 on Fig. 1 and viewed in the direction of the arrows. Figure 6 is a section taken at the line 6—6 on Fig. 1 and viewed in the direction of the arrows, with certain parts broken away, this section being taken through the switch housing. Figure 7 is a section taken at the line 7—7 on Fig. 3 and viewed in the direction of the arrows. Figure 8 is a section taken at the line 8—8 on Fig. 7 and viewed in the direction of the arrows. Figure 9 is a sectional view taken through the casing showing a detail of construction of one of the means holding the field portion of the motor in place. Figure 10 is a longitudinal view, partly sectional, of the end of the device shown at the left hand side of Fig. 1. Figure 11 is a section taken at the line 11—11 on Fig. 10 and viewed in the direction of the arrows showing the gears arranged for driving the tool at one speed; and Figure 12, a similar view showing the gears arranged for the driving of the tool at greater speed.

The main casing of the device, and in which the electric motor, the tool rotating spindle and the gearing for driving the spindle from the motor, is located, is formed of the end sections 7 and 8 which may be, and preferably are, in the form of castings, and an intermediate casing section 9 which is formed of sheet metal, preferably being formed of a section of steel tubing cut to the desired length. The casing referred to incloses the electric motor referred to which is located within the confines of the intermediate section 9. The field portion of the motor is shown as formed of a plurality of flatwise-opposed disks 100 having the diametrically-opposed segmental portions 101 at which they fit within the casing 9 and the diametrically-opposed inwardly inset portions 102 containing notches 103. The portions 101 contain openings 104 to receive the tie-rods hereinafter referred to and the several disks 100 are connected together by the rivets 105. The field windings, represented at 106, are wound upon the portions 102 and extend into the notches 103 as shown. The field portion of the motor is secured in the casing, against movement lengthwise of the latter, by means of lugs 107 thereon adjacent one end of the field portion, and coiled springs 200 surrounding rods hereinafter referred to. The lugs 107 extend inwardly at one end of the assembled disks 100, these lugs being shown as formed by striking portions of the casing inwardly, and lugs 107ª struck inwardly from the metal of the casing section 9, and extending into the spaces between the portions 101, prevent rotation of the field portion of the motor.

The armature shaft of the motor is represented at 10, this shaft being journaled at one end in the end section 8 which is shown as provided with a breast knob 11 for the usual purpose, this end of the shaft being provided with the commutator represented at 12 and with which brushes 13 cooperate. The brushes are supported in holders 14 mounted on a plate 14ª which is rotatably mounted on an inwardly extending boss 8ª on the inner face of the end section 8 to adapt the plate 14ª, with its brushes 13, to be revolved about the commutator 12 into any desired position of adjustment relative to the latter, the devices represented at 15, which extend through slots 16 in the support 14ª and which are connected with the end section 8, serving to hold the brush plate 14ª in adjusted position.

The opposite end of the armature shaft 10, which extends beyond the adjacent end of the casing section 9, carries an air-agitating member 17 of any desirable construction, and beyond this member the shaft is journaled in a disk 18 which fits within the adjacent end of the casing section 9, this disk containing a radial rib 19 on its inner face which is provided with a passage therethrough (not shown), which opens at one end into the interior of the bearing provided by this disk for the shaft 10, and at its outer end through the periphery of the disk, for the reception of oil to lubricate this bearing, the outer end of this passage being provided with a removable closure (not shown) such as a screw-plug, which extends through a slot (not shown) in the casing section 9 whereby oil may be introduced into the passage referred to, from the exterior of the device. The section 8 contains means for lubricating the shaft adjacent thereto as explained of the disk 18, the screw-plug for the oil passage provided thereby being shown at 19ª. The disk 18, shown as a casting, is provided at its periphery with a continuous flange 20, and at diametrically opposed points with bosses 21, the flange and bosses being integral with the body of the disk. The end of the shaft 10 beyond the disk 18 carries a pinion 10ª meshing with gearing hereinafter described for driving a gear 22 fixed on a shaft 23 journaled in the tubular extension 7ª of the section 7 and terminating in a chuck-head 7ᵇ for receiving the distal end of the tool to be rotated. The gearing referred to and as shown is provided for driving the shaft 23 at different speeds by the rearranging of the gears and to this end the disk 18 is provided with shafts 108 and 109 extending lengthwise of the device and extending into sockets 110 and 111, respectively, in the end-plate 7, and a gear element formed of a gear 112 and a pinion 113 connected together and adapted to be applied to journaling position on either shaft 108 and 109 as desired. In Figs. 10 and 11 the gear 112 and pinion 113 are on the shaft 108, the gear 112 meshing with the pinion 10ª and the pinion 113 with the gear 22. In Fig. 12 the gear 112 and pinion 113 are on the shaft 109 and are turned end for end as compared with their position in Figs. 10 and 11, and the gear 112 meshes with the pinion 10ª and the gear 22.

The opposed faces of the end sections 7 and 8, which are of circular shape, are recessed as represented at 7ᶜ and 8ᵇ, respectively, the recess 8ᵇ being peripheral. The recess 7ᶜ receives the disk 18 and the recess 8ᵇ receives the adjacent end of the casing section 9 whereby the latter and the end section 8 are telescoped for a slight distance, the opposite end of the casing-section 9 surrounding the disk 18 and bearing at an edge against the section 7.

The sections 7, 8 and 9, with the operative parts assembled therewith to the position hereinbefore described, are rigidly secured together by means of the rods hereinbefore referred to as surrounded by the springs 200 represented at 24, these rods, which are diametrically opposed, extending lengthwise of the casing through the openings 104 in the plates 100, through openings 25 in the boss-equipped portions of the disk 18 and entirely through the end sections 7 and 8, any suitable means being employed for clamping the casing sections together. As shown, these rods are screw-threaded at their opposite ends, and the clamping referred to is effected by means of nuts 26 screwing upon the ends of the rods 24 and against the sections 7 and 8, washers 27 being preferably interposed between the nuts 26 and the outer end face of the section 8. The rods 24 also have nuts 24ª screwed thereon against the inner face of the disk 18.

The casing-section 9 is provided with a circumferential series of openings 9ˣ located in a plane adjacent to the disk 18, these openings being preferably provided by punching portions of the metal of this section to present the louvers 28, these openings being provided for air circulation which aids in the cooling of the contents of the casing. The section 9 contains in its wall, adjacent the brushes 13, diametrically-opposed openings 9ª, provided in accordance with common practice, to permit of access to the brushes for adjusting the latter, these slots being covered by a split spring-band 29 surrounding this part of the casing, and held in position on the latter by means of a bolt 30 extending through the deflected end portions 31 of the band and serving to clamp it in place. The band 29 by preference contains series of slots 32 registering with the openings 9ª in the casing section 9 and serving to aid in keeping the mechanism within the casing section 9 in cooled condition.

The housing for the switch mechanism controlling the operation of the motor within the casing, is represented generally at 33 and is shown as supported on the casing section 9.

The housing referred to, and which is preferably constructed of sheet metal, is shown as formed of three sections, 34, 35 and 36. The section 34 is formed of a sheet of metal punched and bent to form opposite side walls 37 of the housing, an end wall 38 and a bottom wall 39, considering the construction positioned as shown in Fig. 1, the extremities of the side walls 37 extending beyond the lower edge of the end wall 38. These extremities are shown at 39 and fit flatwise against the under side of the casing section 9 to which they are secured, as for example, by spot welding them in position thereon. The side walls 37 contain, adjacent the end wall 36, slots 40 for a purpose hereinafter explained, and the end wall 38 is slotted as represented at 41, to permit of the outward projection therethrough, of the lever 42 forming a part of the switch mechanism enclosed within the housing and through the medium of which the contacts of the switch are operated, the switch mechanism which may be of any suitable construction, being held in place within the housing through the medium of screws 43 which screw into the body portion of the switch and engage at their heads with the end wall 38. The cable through which the current is supplied to the switch is represented at 44, this cable leading into the housing through one of the side walls 37 and its terminals being connected with the binding posts of the switch, represented at 45. The end wall 36 of the housing is formed of a plate having its ends bent at right angles to provide the extensions 46 which telescope with the side walls 37, as shown in Fig. 6, these extensions being provided on their outer surfaces with projections represented at 47, which may be formed by deflecting the metal as shown, and which, in the assembling of the section 36 with the section 33, spring into the slots 40 and releasably hold these parts together. The section 35, which may be a casting, is formed with a plate-like portion 48 which fits flatwise against the under side of the bottom wall 39 of the housing to which it is secured in any desirable way, as, for example, by spot-welding it thereto, the section 35 being also provided with a depending cylindrical boss 49 which is internally screw-threaded to receive a handle represented at 50.

The provision of the rods 24 with the nuts thereon as stated, permits, upon the removal of the nuts 26 at the right hand end of the structure in Fig. 1, of the separation of the casing sections without disassembling the section 7 from the disk 18 and disturbing the gears, and upon removing the nuts 26 at the left hand end of the device, the separation of the casing section 7 and disk 18 for any desired purpose, as, for example, to rearrange the gear 112 and pinion 113.

From the foregoing, it will be readily understood that a structure provided in accordance with our invention may be manufactured very much more economically than structures as hithereto provided and formed as hereinbefore stated, without sacrificing the strength necessary to be presented by the structure to maintain it in unimpaired condition in the comparatively rough use to which it is put in practice, and permits the device to be conditioned for rotating the tool at either of two speeds without changing the speed at which the motor operates.

While we have illustrated and described a certain construction embodying our invention, we do not wish to be understood as intending to limit it thereto as the same may be variously modified and altered without departing from the spirit of our invention.

What we claim as new, and desire to secure by Letters Patent, is:

1. In a structure of the character set forth, the combination of a casing to house a power device, and a housing for control mechanism for said power device, said housing being carried by said casing and formed of sheet-metal, portions thereof extending angularly relative to the side-walls thereof and flatwise-opposing said casing and united to said casing.

2. In a structure of the character set forth, the combination of a casing to house a power device, and a housing for control mechanism for said power device, said housing being carried by said casing and formed of sections one of which is of sheet metal to provide certain of the sides of said housing certain of which extend at an angle to each other, said housing being secured to said casing by said section, and the other section thereof forming another side of said housing.

3. In a structure of the character set forth, the combination of a casing to house a power device, and a housing for control mechanism for said power device, said housing being carried by said casing and formed of sections one of which is of sheet metal to provide certain of the sides of said housing certain of which extend at an angle to each other, said housing being secured to said casing by said section, and the other section thereof forming another side of said housing and releasably engaging said first-referred-to section.

4. In a structure of the character set forth, the combination of a casing to house a power device, and a housing for control mechanism for said power device, said housing being carried by said casing and formed of sections one of which is of sheet metal to provide certain of the sides of said housing certain of which extend at an angle to each other, said housing being secured to said casing by said section, and the other section thereof having portions which telescope with the adjacent walls of said housing and are secured in such position.

5. In a structure of the character set forth, the combination of a casing to house a power device, and a housing for control mechanism for said power device, said housing being carried by said casing and formed of sections one of which is of sheet metal to provide certain of the sides of said housing certain of which extend at an angle to each other, said housing being secured to said casing by said section, and the other section thereof having portions which telescope with the adjacent walls of said housing and interengaging elements on said last-referred-to walls and said portions for releasably holding the parts in position.

6. In a structure of the character set forth, the combination of a casing to house a power device, and a housing for control mechanism for said power device, said housing being carried by said casing and formed of sections, one of which is of sheet metal to provide three side walls angularly disposed and a cross-wise extending wall, opposed side walls having extensions which extend angularly relative thereto and are flatwise opposed to, and connected with, said casing, said opposed side walls being slotted, and the other of said sections forming the fourth, removable, side of said housing and having angularly disposed extensions provided with projections, said last-named extensions telescoping with said slotted walls and said projections extending into said slots by means of the springiness of the metal.

7. In a structure of the character set forth, the combination of a casing, a motor in said casing, and means comprising portions struck inwardly from the metal of said casing and engaging the field portion of the motor for preventing displacement of said field portion lengthwise of the casing.

8. In a structure of the character set forth, the combination of a casing, a motor, having a field portion, in said casing, the portion of said casing between its end portions being of substantially uniform diameter throughout its length, and means integral with the casing and engaging the field portion of the motor for preventing displacement of said field portion lengthwise of the casing, said means being provided on said portion of said casing of substantially uniform diameter and intermediate the ends of this substantially uniform diameter portion.

9. In a structure of the character set forth, the combination of a casing, a motor, having a field portion, in said casing, the portion of said casing between its end portions being of substantially uniform diameter throughout its length, and means integral with the casing and engaging the field portion of the motor for preventing displacement of said field portion lengthwise of the casing, said means being in the form of lugs struck inwardly from said portion of substantially uniform diameter intermediate the ends of this portion.

10. In a structure of the character set forth, the combination of a casing for a power device comprising end sections and an intermediate tubular section of uniform thickness throughout its length, means securing said sections together, and a housing for control mechanism for said power device, said housing being carried by said casing and formed of sheet metal and having flanges which flatwise oppose said intermediate section of the casing, said flanges being united to said casing.

JAMES S. KNOWLSON.
ROBERT S. McKEAGE.